United States Patent [19]

Greenburg

[11] Patent Number: 4,518,150

[45] Date of Patent: May 21, 1985

[54] VALVE WITH SPLIT RING RETAINER

[75] Inventor: Jimmy L. Greenburg, Broken Arrow, Okla.

[73] Assignee: Dover Corporation, Tulsa, Okla.

[21] Appl. No.: 529,850

[22] Filed: Sep. 6, 1983

[51] Int. Cl.³ .............................................. F16K 1/22
[52] U.S. Cl. .................................... 251/306; 251/314
[58] Field of Search ............... 251/305, 306, 308, 314, 251/361

[56] References Cited

U.S. PATENT DOCUMENTS

| 4,249,555 | 2/1981 | Scaramucci | 251/306 |
| 4,327,765 | 5/1982 | Wilson et al. | 251/306 |
| 4,399,976 | 8/1983 | Legris | 251/306 |

Primary Examiner—Martin P. Schwadron
Assistant Examiner—Sheri Novack
Attorney, Agent, or Firm—Head, Johnson & Stevenson

[57] ABSTRACT

An improved butterfly valve in which the body flow passageway receives a pair of seat ring retainers, each retainer having a cylindrical sidewall with planar rearward faces and with planar rearward faces which are at an acute angle to the plane of the rearward end faces, the forward end faces having a groove therein. When the retainers are assembled within the valve body a toroidal seat ring can be received in the groove between the retainers. A disc having a circumferential sealing surface is rotatably supported in the valve body to close against the seat ring.

8 Claims, 7 Drawing Figures

VALVE WITH SPLIT RING RETAINER

SUMMARY OF THE INVENTION

A type of valve commonly used in industrial is known as a "butterfly" valve. This type of valve has a disc rotatably supported in a cylindrical passageway. The disc can be rotated so that the peripherial seat surface engages the sidewall of the flow passageway to close flow through the valve, or when rotated 90°, flow is permitted to either side of the disc. Butterfly valves are popular because of they are economical, quick opening and closing and are dependable.

The present invention is directed toward an improved butterfly valve arrangement which is particularly characterized by an improved and highly effective means of retaining a circumferential seal. The valve includes a body having a flow passageway through it having an axial top and bottom shaft opening. Positioned within the valve body are a pair of seat retainer rings. Each seat retainer ring is formed of a cylindrical sidewall having a flow passageway through it. Each of the retainer rings has a planar rearward end face and a planar forward end face. The rearward end face is in a plane perpendicular the axis of the flow passageway and the plane of the front end face is at an acute angle to the plane of the rearward end face. The forward end face has a seat retaining groove. Each seat ring retainer has a stem opening in the cylindrical sidewall, the axis of the stem being perpendicular to the axis of the flow passageway through the retainer.

The forward end faces of opposed seat rings when matingly assembled in the valve body form a circumferential seat capturing groove there between. The stem openings of the retainers when assembled are displaced 180° from each other and in axial alignment with the shaft openings of the valve body.

A toroidal seat ring is received between the pairs of retainers. The seat ring may be of a variety of material and configured so that a portion thereof extends circumferentially inwardly into the flow passageway in the retainers. The configuration of the groove formed in the retainers, when the retainers are matingly assembled, serving to hold the seat ring in position.

A disc is supported within the assembled retainers within the valve body. The disc has a circumferential sealing surface.

An upper and a lower shaft are received in the valve body and the seat retainer shaft openings. The shafts engage and support the disc. At least one of the shafts extend externally of the valve body for rotatably positioning the disc. When the disc is rotated so that its circumferential sealing surface engages the toroidal seat ring the valve is closed against fluid flow therethrough. When the disc is rotated 90° from the closed position, fluid is free to flow to either side of the disc.

DESCRIPTION OF THE DRAWING

FIGS. 1 and 2 show the valve in fully assembled and closed condition.

FIG. 3 is an end view of the forward face of the seat ring retainer.

DETAILED DESCRIPTION OF PREFERRED EMBODIMENT

Figure 1:
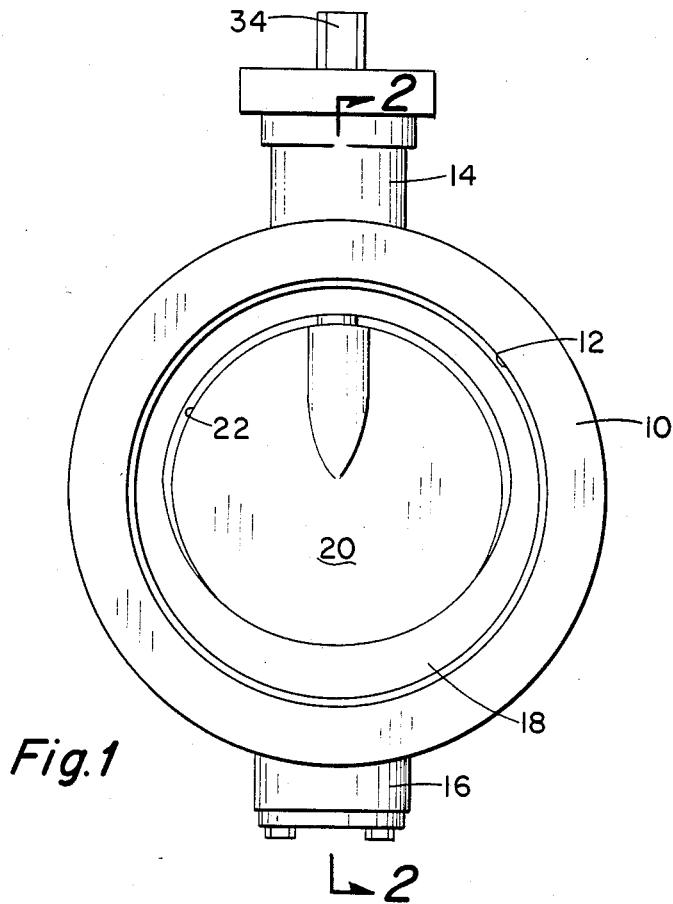
FIG. 1 is an end view of a butterfly valve incorporating the principles of this invention. The valve is shown in closed condition.

Referring to the drawings and first to FIG. 1 a butterfly valve which incorporates the invention is shown in end view. The valve includes a body 10 having a flow passageway 12 therethrough. Integrally formed with the body is an upper shaft boss 14 and a lower shaft boss 16. Received in the passageway 12 is a first seat ring retainer 18. An important and unique feature of the invention is the configuration of the seat ring retainer 18. A second seat ring retainer, not seen in FIG. 1, is received in the flow passageway 12. Together the two seat ring retainers support a seating ring as will be described subsequently.

Received within the seat ring retainers is a disc 20 which has a circumferential sealing surface 22.

Figure 2:
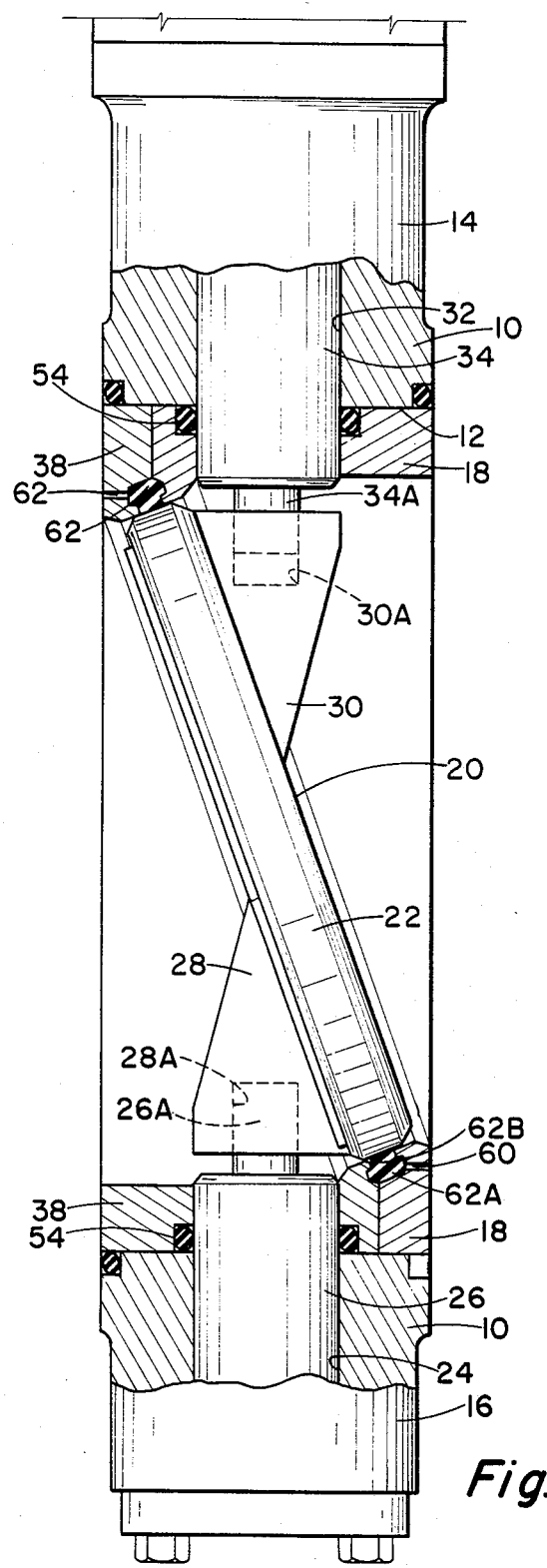
FIG. 2 is a cross-sectional view taken along the line 2—2 of FIG. 1.
Figure 6:
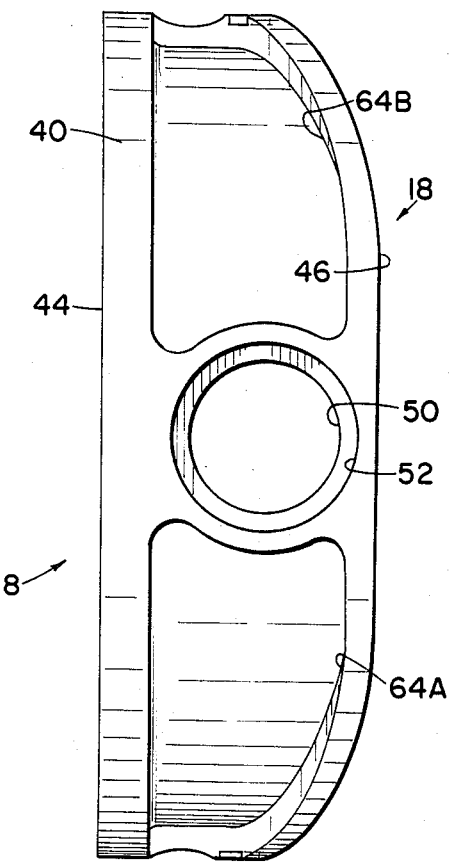
FIG. 6 is an end view as taken along the line 6—6 of FIG. 5.

Referring to FIG. 2, more details of the butterfly valve of this invention are illustrated. The valve body lower shaft boss 16 has an opening 24 which receives a lower shaft 26. The disc 20 has bosses 28 and 30 on opposite sides thereof. The lower boss 28 has an opening 28A receiving an upper reduced diameter extension 26A of shaft 26 to rotatably support the disc in the valve body. The boss 28 may either be secured to the shaft 26 so that the shaft rotates or the shaft may be stationary so that the boss portion rotates about the upper extension 26A.

The body upper shaft boss includes an opening 32 which rotatably receives an upper shaft 34. Shaft 34 extends exteriorally of boss 14 as shown in FIG. 1 and provides means whereby the disc 20 may be rotated between the opened and closed positions.

The disc upper boss 30 has a slotted opening 30A which receives the lower reduced diameter and flatted extension 34A of the upper shaft. The lower portion of the upper shaft is received in the upper boss 30 opening 30A which provides a means of rotating the disc 20 and shaft 34 as one unit.

The specific arrangement of the disc bosses 28 and 30, the shafts 26 and 34 and the means of coupling these shafts to the disc for supporting the disc within the valve body are merely by way of example and other arrangements may be utilized as are well known in the art of manufacturing butterfly valves. The specific arrangement of the shafts and the boss portions 28 and 30 are not crucial to the unique aspects of the invention.

An important aspect of the invention is in the employment of a pair of unique seat ring retainers. In the preferred method of utilizing the invention the seat ring retainers are identically formed. However, it will be seen that they could be manufactured to be different from each other while keeping within the principles of the invention. In the embodiment illustrated herein the first seat ring retainer 18 is matched by a second and duplicate seat ring retainer 38. Since the retainers are duplicates only retainer 18 will be described. The retainer is best understood by reference to FIGS. 3 through 7. The retainer is a cylindrical member having a cylindrical sidewall 40 of an outside diameter to be slideably received in the body flow passageway 12, and a flow passageway 42 extends through the cylindrical retainer. One end of the cylindrical member is a rearward end 44 which is in a plane perpendicular the axis of flow passageway 42. The other end of the cylindrical member is a forward face 46 which is of general planar configuration, the plane being at an acute angle to the plane of the rearward face 44.

Figure 7:
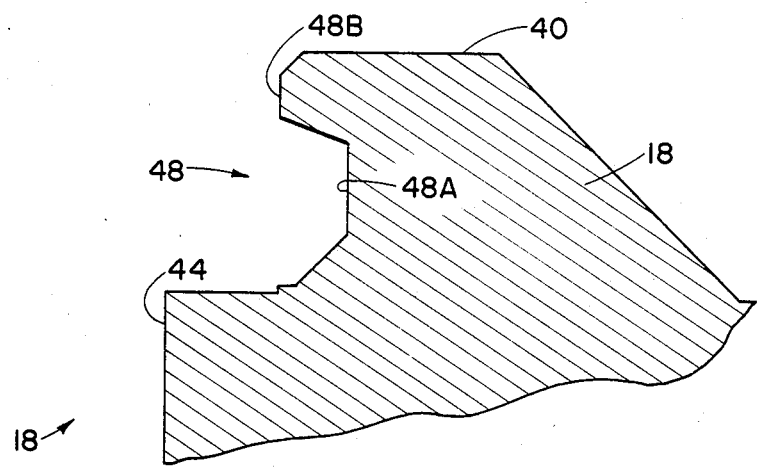
FIG. 7 is a cross-sectional view taken along the line 7—7 of FIG. 4, greatly enlarged, showing the configuration of the seat ring groove.

Formed in the forward face 46 is a circumferential groove 48. The function of groove 48 is to retain a seat ring which will be described subsequently. In the preferred arrangement the groove 48 is configured as best illustrated in FIG. 7, to have an inner portion 48A of greater depth than the outer portion 48B.

Figure 4:
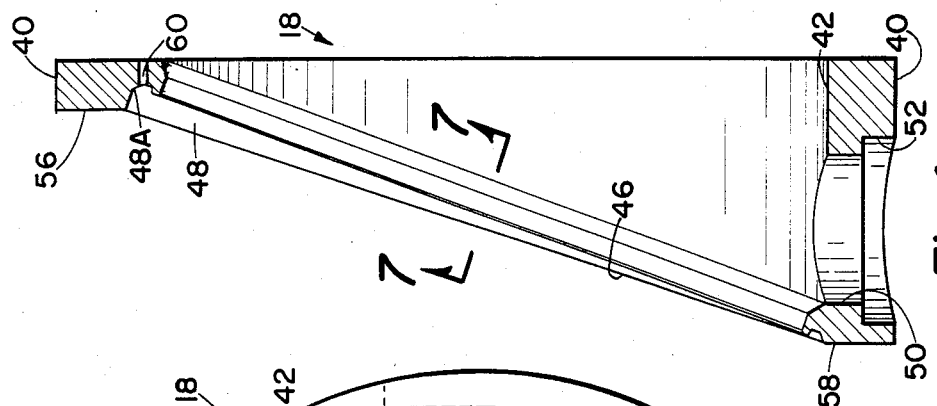
FIG. 4 is a cross-sectional view taken along the line 4—4 of FIG. 3 of a seat ring retainer.
Figure 5:
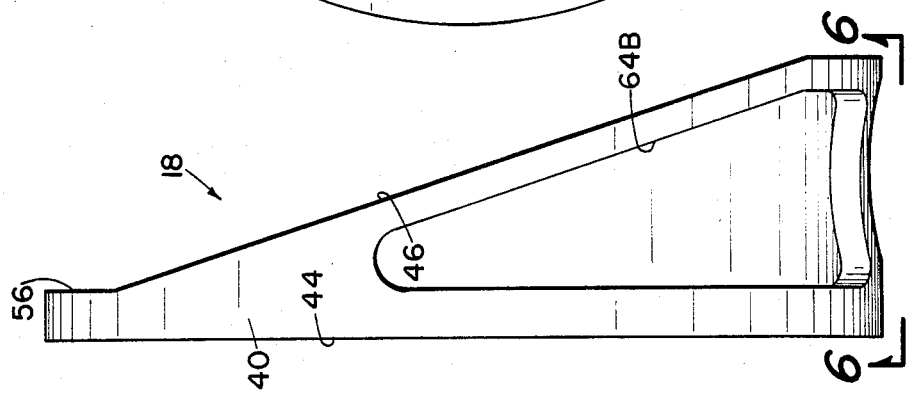
FIG. 5 is an elevational side view of a seat ring retainer.

By the provision of the forward face 46 being generally in a plane angeled to the rearward face 44, the cross-sectional configuration of the retainer is generally of the retainer is generally triangular as seen in FIGS. 4 and 5. Formed in the portion of the sidewall having the maximum length is a shaft opening 50, the axis of which is perpendicular the axis of the flow passageway 42. An enlarged diameter circumferential recess 52 around opening 50 provides means for receiving an O-ring gasket 54.

In the illustrated and a preferred arrangement, the depth of the groove 48 formed in the retainer forward face 46 varies from a maximum in the area opposite the shaft opening 50 to a minimum depth in the area adjacent shaft opening 50. This is best seen in FIG. 4. By this arrangement, the thickness of material around the shaft opening 50 is preserved without the necessity of increasing the total length of the retainers. With the retainers being identical when used in pairs and assembled in the valve body as shown in FIG. 2, the total width of the groove 48 formed by abutting retainers is the same around the full 360° groove periphery.

In the embodiments illustrated herein the forward face 46 of the retainer is configured such as to provide opposed flat areas 56 and 58.

Figure 3:
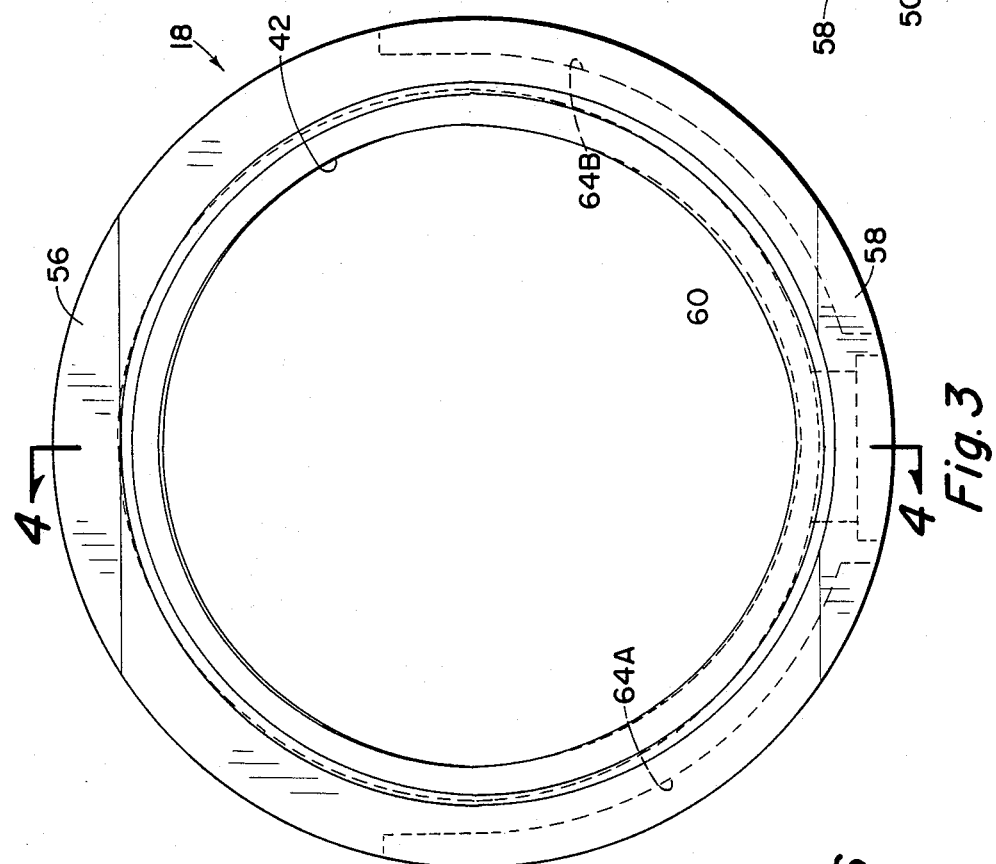
FIG. 3 is an end view of a seat ring retainer. It is the seat ring retainer which is the primary unique feature of the invention. Two seat ring retainers which are of identical configuration, are employed in the valve.

As seen in FIGS. 3 and 4, small diameter openings 60 communicate the groove 48 with fluid pressure so as to enhance the pressure sealing ability of the seal ring.

The seal ring employed in the valve is indicated by the numeral 62. The seal ring is toroidal, that is, it is an uninterrupted ring having a uniform cross-sectional configuration to be received and retained within the groove formed by the mating of two retainer members. The seal ring preferrably has a cross-sectional configuration such as shown in FIG. 2 which includes a wider portion 62A at the outer circumferential area and an integral narrower portion 62B at the inner circumferential area. The narrower portion 62B extends normally beyond the retainer interior flow passageway surface so that when the disc 20 is rotated to the closed position, as shown in FIG. 2, the disc circumferential sealing surface 22 engages the seal ring extending portion 62B, to thereby seal the valve against the passage of fluid. It can be seen that when the disc is rotated to 90° from the position as shown in FIGS. 1 and 2, that fluid would be free to flow through the valve to either side of the disc and that in such condition little contact is made between the disc and the seal ring 62.

The retainer may be made as an uninterrupted cylindrical member except for the shaft opening 50 and may be fabricated of metal, plastic, fiberglass and so forth. When fabricated of a moldable material, such as plastic, it is, in some instances desireable that the quantity of material be reduced for more effective casting operations. In these cases, the sidewalls may be provided with recesses 64A and 64B. Such recesses do not change the function of the retainers nor do they provide avenues of fluid flow. Instead of recesses, which are areas of reduced material thickness, the areas 64A and 64B may be openings through the cylindrical retainer wall.

The seal ring 62 may be of elastomeric material as illustrated, such as natural or artificial rubber, or the ring may be of stiff material such as plastic or metal.

The embodiments set forth herein is a preferred embodiment of the invention at the time of preparation of this description, however it can be appreciated that many variations may be made of the specific configuration of the retainers, the configuration of the groove for retaining the seal ring, and the configuration of the seal ring itself while nevertheless maintaining the concepts of the invention. It is understood that the embodiment therefore does not limit the invention but that the invention is to be limited only by the scope of the claim or claims attached, including the full range of equivalency to which each element thereof is entitled.

What is claimed is:

1. An improved butterfly valve comprising:

a valve body having a flow passageway therethrough and having coaxial top and bottom shaft openings intersecting the flow passageway;

a pair of seat ring retainers, each retainer being formed of a cylindrical sidewall having a flow passageway therethrough and having a planar rearward end face and a planar forward end face, the plane of the rearward face being perpendicular the axis of the flow passageway and the planar front face being at an acute angle to the plane of the rearward face, the forward face having a seat retaining groove therein, and each seat ring retainer having a shaft opening in the sidewall, the forward end faces of opposed seat rings when matingly assembled in said valve body forming a circumferential seat capturing groove therebetween, the shaft openings of the retainers when assembled being in alignment with said body shaft openings;

a toroidal seat ring received between said pair of retainers;

a disc having a circumferential sealing surface rotatably supported within said valve body and within said seat retainers; and an upper and a lower shaft received in said body and said seat retainer shaft openings, at least one shaft extending externally of said body, the shafts engaging said disc for rotatably supporting and positioning the disc whereby in one position the circumferential sealing surface thereof engages said seat ring to close said flow passageway and in another position fluid is free to flow in the flow passageway to either side of said disc.

2. The improved butterfly valve according to claim 1 wherein said seat retaining groove formed by the mating of said seat retainers is configured, in cross-section, to have an inner portion and an outer portion, the inner portion being of greater width than the outer portion and wherein said seat ring is of generally mating cross-sectional configuration whereby said seat ring is effectively retained in said groove.

3. The improved butterfly valve accordiing to claim 1 wherein the width of said seat retaining groove in each of said seat retainers is tapered and has a maximum width displaced 180° from the area thereof having a minimum width, the total width of the groove when said seat elements are assembled being uniform.

4. The improved butterfly valve according to claim 3 whereby said tapered width groove in each said seat ring retainer is oriented such that the minimum width area of the groove is adjacent said stem opening therein.

5. The improved butterfly valve according to claim 1 wherein each said retainer has recesses in the sidewall thereof to reduce the material required to manufacture the retainer.

6. The improved butterfly valve according to claim 1 wherein said disc has shaft receiving bosses on opposite sides thereof, the bosses being opposed to each other and each having a shaft receiving recess therein, the recesses being in axial alignment.

7. The improved butterfly valve according to claim 1 wherein the axis of said shaft opening in said seat ring retainer sidewall is perpendicular the axis of the flow passageway through the retainer.

8. The improved butterfly valve according to claim 1 wherein said seat ring is held in said body by said seat ring retainers in a plane displaced at an angle of less than 90° to the axis of the flow passageway.

* * * * *